(12) United States Patent
Wei et al.

(10) Patent No.: US 10,554,573 B2
(45) Date of Patent: Feb. 4, 2020

(54) STREAMING MEDIA DATA TRANSMISSION METHOD AND APPARATUS

(71) Applicant: ZTE CORPORATION, Shenzhen, Guangdong Province (CN)

(72) Inventors: Yuefei Wei, Shenzhen (CN); Guangliang Chen, Shenzhen (CN); Meiyan Zhou, Shenzhen (CN)

(73) Assignee: ZTE CORPORATION (CN)

( * ) Notice: Subject to any disclaimer, the term of this patent is extended or adjusted under 35 U.S.C. 154(b) by 103 days.

(21) Appl. No.: 15/739,787

(22) PCT Filed: Apr. 28, 2016

(86) PCT No.: PCT/CN2016/080530
§ 371 (c)(1),
(2) Date: Dec. 26, 2017

(87) PCT Pub. No.: WO2017/000649
PCT Pub. Date: Jan. 5, 2017

(65) Prior Publication Data
US 2018/0343207 A1 Nov. 29, 2018

(30) Foreign Application Priority Data

Jul. 2, 2015 (CN) .......................... 2015 1 0383482

(51) Int. Cl.
*H04L 29/06* (2006.01)
*H04L 12/863* (2013.01)
*H04L 1/00* (2006.01)
*H04L 29/08* (2006.01)

(52) U.S. Cl.
CPC ........ *H04L 47/6295* (2013.01); *H04L 1/0042* (2013.01); *H04L 65/607* (2013.01); *H04L 65/80* (2013.01); *H04L 67/02* (2013.01)

(58) Field of Classification Search
CPC ... H04L 47/6295; H04L 1/004; H04L 1/0042; H04L 65/607; H04L 65/608; H04L 65/80
USPC .......................................................... 709/231
See application file for complete search history.

(56) References Cited

U.S. PATENT DOCUMENTS

| 2002/0193106 | A1 | 12/2002 | Koo et al. | |
|---|---|---|---|---|
| 2009/0077205 | A1* | 3/2009 | Quinet | H04L 29/06 709/219 |
| 2014/0281002 | A1* | 9/2014 | Sun | H04L 29/06455 709/231 |

(Continued)

FOREIGN PATENT DOCUMENTS

| CN | 101222436 A | 7/2008 |
|---|---|---|
| CN | 101938322 A | 1/2011 |

(Continued)

*Primary Examiner* — Glenford J Madamba
(74) *Attorney, Agent, or Firm* — McDonald Hopkins LLC

(57) ABSTRACT

Disclosed is a method for transmitting streaming media data, applied to a streaming server, including: determining priorities of data blocks of different types in streaming media data; respectively encoding the data blocks in the streaming media data to be broadcasted live currently to generate corresponding redundant codes; and after the streaming media data to be broadcasted live currently are completely sent, sequentially sending the redundant codes corresponding to the data blocks according to the priorities of the data blocks in the streaming media data from high to low.

10 Claims, 2 Drawing Sheets

(56) References Cited

U.S. PATENT DOCUMENTS

2014/0307734 A1* 10/2014 Luby ................ H04L 12/18
 370/390

FOREIGN PATENT DOCUMENTS

| CN | 102148815 A | | 8/2011 |
|---|---|---|---|
| CN | 102244608 A | | 11/2011 |
| CN | 103632671 A | * | 3/2014 |
| CN | 103632671 A | | 3/2014 |
| CN | 104125161 A | | 10/2014 |
| EP | 2573997 A1 | | 3/2013 |
| WO | WO2008000191 A1 | | 1/2008 |

* cited by examiner

STREAMING MEDIA DATA TRANSMISSION METHOD AND APPARATUS

TECHNICAL FIELD

This document relates to but is not limited to the field of streaming media transmission technology, in particular to a method and an apparatus for transmitting streaming media data.

BACKGROUND

HTTP Live Streaming (HLS) protocol is a streaming data transmission protocol based on HyperText Transfer Protocol (HTTP) and can provide live broadcasting services of streaming media. HTTP is used to realize end-to-end HLS live broadcasting services.

However, under a situation that a great number of users simultaneously request for services, a bottleneck that whole-network live broadcasting is concurrent in a large scale is possibly caused. In this case, a solution of realizing HLS broadcasting by using multicasting emerges at the right moment. When HLS live broadcasting services are realized through multicasting, only one live broadcasting stream needs to be sent from a server to a specific multicasting address, a terminal can join in multicasting and simultaneously receive a multicasting stream, and thereby HLS live broadcasting services can be realized.

When data are transmitted by multicasting, the problem of packet loss which possibly occurs in a transmission process needs to be considered, and related technologies for coping with packet loss include retransmission and redundant code.

However, in an application scenario in which bandwidth resources are limited, since the problem of packet loss frequently causes service interruption or black screen, the user experience is affected.

SUMMARY

The following is a summary of the subject described in detail in this document. This summary is not used for limiting the protection scope of the claims.

The present disclosure provides a method and an apparatus for transmitting streaming media data, which can guarantee the service quality of live broadcasting services of streaming media and improve the user experience.

An embodiment of the present disclosure provides a method for transmitting streaming media data, applied to a streaming media server, including:
  determining priorities of data blocks of different types in streaming media data;
  respectively encoding the data blocks in the streaming media data to be broadcasted live currently to generate corresponding redundant codes; and
  after the streaming media data to be broadcasted live currently are completely sent, sequentially sending the redundant codes corresponding to the data blocks according to the priorities of the data blocks in the streaming media data from high to low.

In an exemplary embodiment, determining priorities of data blocks of different types in streaming media data includes:
  determining an index file in the streaming media data to have a high priority and determining a Transport Stream (TS) file in the streaming media data to have a low priority,
  herein the data blocks are index files or Transport Stream (TS) files.

In an exemplary embodiment, after respectively encoding data blocks in streaming media data to be broadcasted live currently to generate corresponding redundant codes, the method further includes:
  whenever a redundant code corresponding to one index file is generated, putting the redundant code into a first queue; and
  whenever a redundant code corresponding to one TS file is generated, putting the redundant code into a second queue,
  herein the first queue and the second queue are First Input First Output (FIFO) queues.

In an exemplary embodiment, sequentially sending the redundant codes corresponding to the data blocks according to the priorities of the data blocks in the streaming media data from high to low includes:
  preferentially sending the redundant codes in the first queue; and
  after the first queue is empty, sending the redundant codes in the second queue.

In an exemplary embodiment, the streaming media data are data based on an HTTP Live Streaming (HLS) protocol.

An embodiment of the present disclosure provides an apparatus for transmitting streaming media data, applied to a streaming media server, including:
  a priority division module configured to determine priorities of data blocks of different types in streaming media data;
  a redundant code encoding module configured to respectively encode the data blocks in the streaming media data to be broadcasted live currently to generate corresponding redundant codes; and
  a redundant code sending module configured to, after the streaming media data to be broadcasted live currently are completely sent, sequentially send the redundant codes corresponding to the data blocks according to the priorities of the data blocks in the streaming media data from high to low.

In an exemplary embodiment, the priority division module is configured to determine priorities of data blocks of different types in streaming media data by the following mode:
  determining an index file in the streaming media data to have a high priority and determining a Transport Stream (TS) file in the streaming media data to have a low priority,
  herein the data blocks are index files or Transport Stream (TS) files.

In an exemplary embodiment, the redundant code encoding module is further configured to, whenever a redundant code corresponding to one index file is generated, put the redundant code into a first queue; and whenever a redundant code corresponding to one TS file is generated, put the redundant code into a second queue,
  herein the first queue and the second queue are First Input First Output (FIFO) queues.

In an exemplary embodiment, the redundant code sending module is configured to sequentially send the redundant codes corresponding to the data blocks according to the priorities of the data blocks in the streaming media data from high to low by the following mode:
  preferentially sending the redundant codes in the first queue; and
  after the first queue is empty, sending the redundant codes in the second queue.

In an exemplary embodiment, the streaming media data are data based on an HTTP Live Streaming (HLS) protocol.

An embodiment of the present disclosure further provides a computer-readable storage medium, storing computer-executable instructions, which, when executed by a processor, implement the above method.

As compared with the related art, by using the method and the apparatus for transmitting streaming media data provided by embodiments of the present disclosure, the data to be transmitted are graded, the corresponding redundant codes are computed, the redundant codes of important data (index files) are preferentially sent, thereby the important data are protected through the redundant codes thereof, the probability of packet loss of important data and terminal delay are deceased, the service quality of live broadcasting services of streaming media based on the HLS protocol is guaranteed and the user experience is improved.

After the drawings and detailed description are read and understood, other aspects can be understood.

DETAILED DESCRIPTION

Embodiments of the present disclosure will be described below in detail with reference to the drawings. It needs to be stated that the embodiments in the present application and features in the embodiments may be freely combined with each other under a situation of no conflict.

In live broadcasting services based on an HLS protocol, effects caused by packet loss of index files and packet loss of Transport Stream (TS) media files are totally different. An index file is a key for a terminal to locate a TS file. If there is no index file, the terminal cannot locate and acquire the TS media file. Therefore, packet loss of index files possibly causes that the terminal cannot correctly locate a certain TS file, consequently interruption of live broadcasting services or black screen is caused and thereby the experience quality of the user is greatly reduced. As compared with the index file, the affect caused by packet loss of TS media files on live broadcasting services is much smaller. For this reason, in an application scenario in which bandwidth resources are limited, realizing HLS live broadcasting through multicasting is especially important for graded protection of data.

Based on the above-mentioned analysis, an embodiment of the present disclosure provides a graded packet sending method. The fundamental concept of the method is to grade index files and TS files, index files are important data, TS files are normal data and then corresponding redundant codes are computed, redundant codes of important data are preferentially processed according to available bandwidth resources. By this method, graded protection of important data can be realized and the probability of packet loss of important data is reduced.

Figure 1:
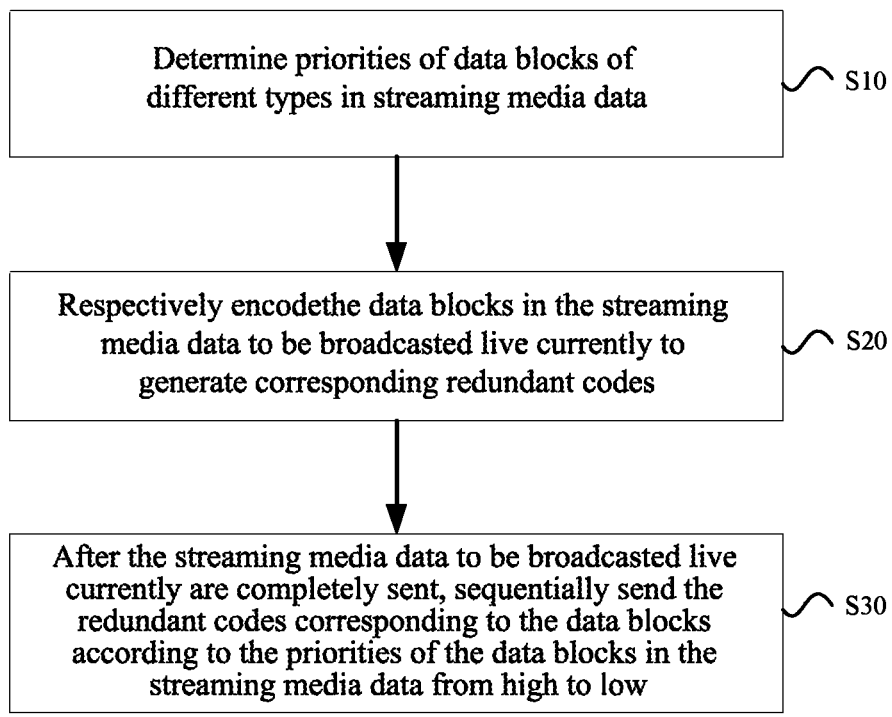
FIG. 1 illustrates a flowchart of a method for transmitting streaming media data according to an embodiment of the present disclosure.

As illustrated in FIG. 1, an embodiment of the present disclosure provides a method for transmitting streaming media data, applied to a streaming media server, including the following steps.

In step S10, priorities of data blocks of different types in streaming media data are determined.

In step S20, the data blocks in the streaming media data to be broadcasted live currently are respectively encoded to generate corresponding redundant codes.

In step S30, after the streaming media data to be broadcasted live currently are completely sent, the redundant codes corresponding to the data blocks are sequentially sent according to the priorities of the data blocks in the streaming media data from high to low.

In an embodiment, determining priorities of data blocks of different types in streaming media data may include:
  determining an index file in the streaming media data to have a high priority and determining a Transport Stream (TS) file in the streaming media data to have a low priority,
  herein the data blocks are index files or Transport Stream (TS) files.

In an embodiment, the streaming media data to be broadcasted live currently may be index files and Transport Stream (TS) files.

In an embodiment, the streaming media data may be data based on an HTTP Live Streaming (HLS) protocol.

In an embodiment, after respectively encoding data blocks in streaming media data to be broadcast live currently to generate corresponding redundant codes, the method may further include:
  whenever a redundant code corresponding to one index file is generated, putting the redundant code into a first queue; and
  whenever a redundant code corresponding to one TS file is generated, putting the redundant code into a second queue,
  herein the first queue and the second queue are First Input First Output (FIFO) queues.

Sequentially sending the redundant codes corresponding to the data blocks according to the priorities of the data blocks in the streaming media data from high to low includes:
  preferentially sending the redundant codes in the first queue; and
  after the first queue is empty, sending the redundant codes in the second queue.

In an embodiment, sequentially sending the redundant codes corresponding to the data blocks according to the priorities of the data blocks in the streaming media data from high to low may include:
  a) Remaining bandwidth is calculated. If no remaining bandwidth exists, emptying the first queue and the second queue are emptied and the process is ended. If remaining bandwidth exists, it is judged whether the first queue is empty. If the first queue is empty, step b) is executed. If the first queue is not empty, a redundant code is selected from the first queue, it is judged whether the length of the redundant code is greater than the remaining bandwidth. If the length is greater than the remaining bandwidth, the first queue and the second queue are emptied and the process is ended. If the length is less than or equal to the remaining bandwidth, the redundant code is sent and the sent redundant code is removed out of the first queue, and then step a) is repeated. And
  b) It is judged whether the second queue is empty. If the first queue is empty, the process is ended. If the second queue is not empty, a redundant code is selected from the second queue, it is judged whether the length of the redundant code is greater than the remaining bandwidth. If the length is greater than the remaining bandwidth, the second queue is emptied and the process is ended. If the length is less than or equal to the remaining bandwidth, the redundant code is sent and the sent redundant code is removed out of the second queue, then the remaining bandwidth is recalculated. If remaining bandwidth does not exist, the second queue is emptied and the process is ended. If there is remaining bandwidth, step b) is repeated.

Figure 2:
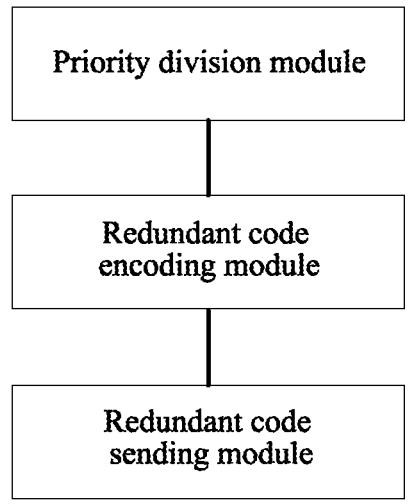
FIG. 2 illustrates a structural schematic diagram of an apparatus for transmitting streaming media data according to an embodiment of the present disclosure.
Figure 3:
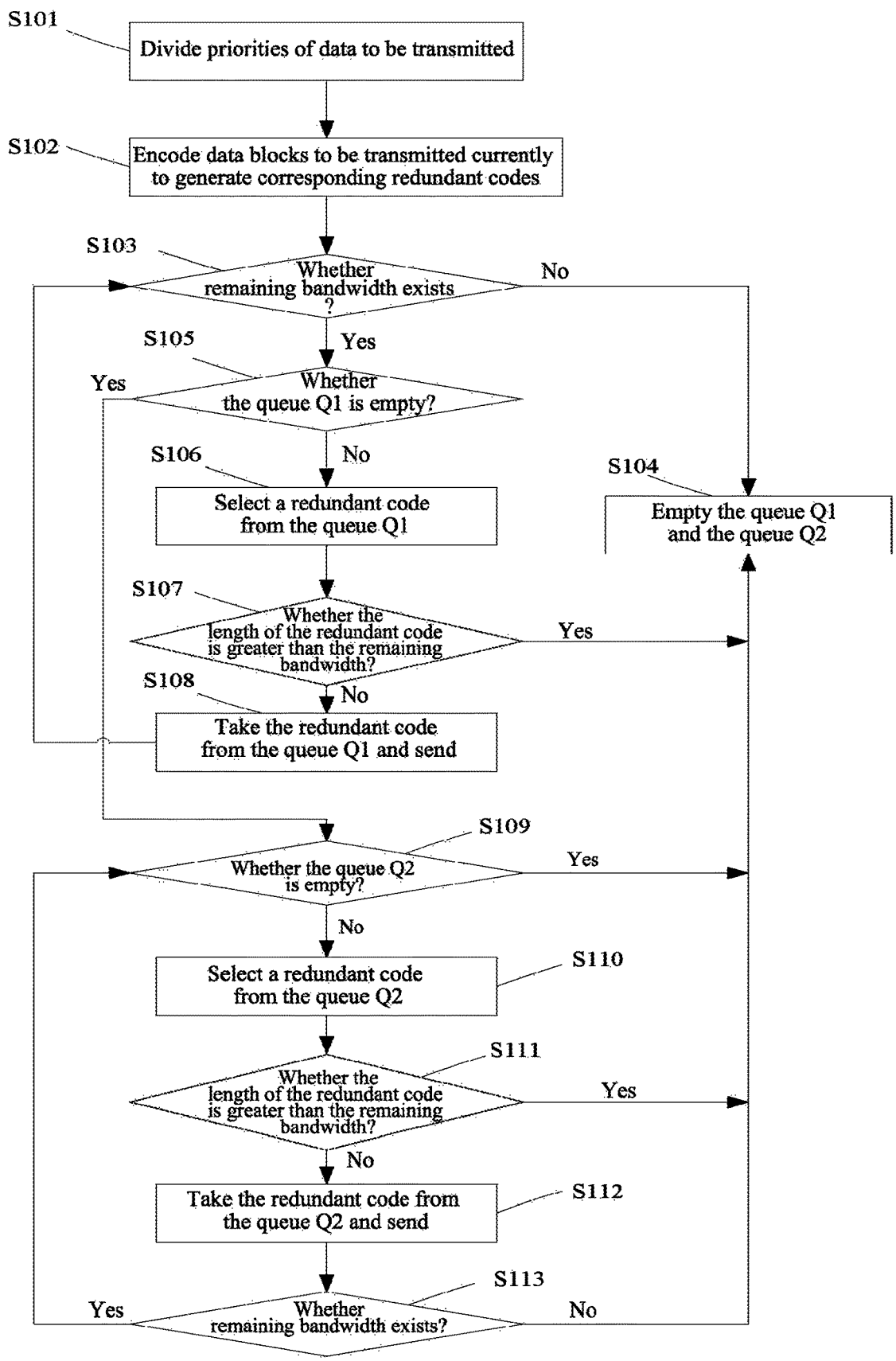
FIG. 3 illustrates a flowchart of a method for transmitting streaming media data according to an application example of the present disclosure.

As illustrated in FIG. 2, an embodiment of the present disclosure provides an apparatus for transmitting streaming media data, applied to a streaming media server, including a priority division module, a redundant code encoding module, and a redundant code sending module.

The priority division module is configured to determine priorities of data blocks of different types in streaming media data.

The redundant code encoding module is configured to respectively encode the data blocks in the streaming media data to be broadcast live currently to generate corresponding redundant codes.

The redundant code sending module is configured to, after the streaming media data to be broadcast live currently are completely sent, sequentially send the redundant codes corresponding to the data blocks according to the priorities of the data blocks in the streaming media data from high to low.

In an embodiment, the priority division module may be configured to determine priorities of data blocks of different types in streaming media data by the following mode:
determining an index file in the streaming media data to have a high priority and determining a Transport Stream (TS) file in the streaming media data to have a low priority,
herein the data blocks are index files or Transport Stream (TS) files.

In an embodiment, the streaming media data to be broadcasted live currently may include index file and Transport Stream (TS) files.

In an embodiment, the streaming media data may be data based on an HTTP Live Streaming (HLS) protocol.

In an embodiment, the redundant code encoding module may be further configured to, whenever a redundant code corresponding to one index file is generated, put the redundant code into a first queue; and whenever a redundant code corresponding to one TS file is generated, put the redundant code into a second queue,
herein the first queue and the second queue are First Input First Output (FIFO) queues.

In an embodiment, the redundant code sending module may be configured to sequentially send the redundant codes corresponding to the data blocks according to the priorities of the data blocks in the streaming media data from high to low by the following mode:
preferentially sending the redundant codes in the first queue; and after the first queue is empty, sending the redundant codes in the second queue.

Application Example

In an application environment with fixed bandwidth, important data and normal data are distinguished, a graded packet sending policy is used, different data can be protected more pertinently, and packet loss of some important data and the like can be avoided. A basic processing flow of the graded packet sending policy includes the following steps.

In step S101, priorities of data to be transmitted are divided.

Index files are considered as important data, TS files are considered as normal data, priorities of index files are high priorities and priorities of TS files are low priorities.

In step S102, data blocks to be transmitted currently are encoded to generate redundant codes corresponding to data blocks.

If the data blocks are important data (index files), corresponding redundant codes are saved into a queue Q1; and if the data blocks are normal data (TS files), corresponding redundant codes are saved into queue Q2.

In step S103, remaining bandwidth is calculated; whether remaining bandwidth exists is judged; if no remaining bandwidth exists, the process turns to step S104; and if remaining bandwidth exists, the process turns to step S105.

In step S104, the queue Q1 and the queue Q2 are emptied and the process ends.

In step S105, whether the queue Q1 is empty is judged; if the queue Q1 is empty, step S109 is executed; and if the queue Q1 is not empty, the process turns to step S106.

In step S106, a redundant code is selected from the queue Q1.

In step S107, whether the length of the redundant code is greater than the remaining bandwidth; if yes, the process turns to step S104; and otherwise, the process turns to step S108.

In step S108, the redundant code is taken out from the queue Q1 and is sent, and the process turns to step S103.

In step S109, whether the queue Q2 is empty is judged; if yes, the process turns to step S104; and otherwise, the process turns to step S110.

In step S110, a redundant code is selected from the queue Q2.

In step S111, whether the length of the redundant code is greater than the remaining bandwidth is judged; if yes, the process turns to step S104; and otherwise, the process turns to step S112.

In step S112, the redundant code is taken out from the queue Q2 and is sent.

In step S113, remaining bandwidth is recalculated; whether remaining bandwidth exists is judged; if no remaining bandwidth exists, the process turns to step S104; and if remaining bandwidth exists, the process turns to step S109.

By using the method and the apparatus for transmitting streaming media data provided by the embodiments of the present disclosure, the data to be transmitted are graded, the corresponding redundant codes are computed, the redundant codes of important data (index files) are preferentially sent, thereby the important data are protected through the redundant codes thereof, the probability of packet loss of important data and terminal delay are deceased, the service quality of live broadcasting services of streaming media based on the HLS protocol is guaranteed and the user experience is improved.

One skilled in the art can understand that all or partial steps in the above-mentioned methods may be completed by relevant hardware (such as a processor) instructed by a program, and the program may be stored in a computer-readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by hardware, e.g., a corresponding function thereof is implemented through an integrated circuit, and it may also be implemented by a software function module, e.g., a corresponding function thereof is implemented by a processor executing programs/instructions stored in a memory. The present application is not limited to combinations of hardware and software in any specific form.

It needs to be stated that the present application may also have other various embodiments. One skilled in the art may make various corresponding changes and variations according to the present application without departing from the rule and essence of the present application. However, these corresponding changes and variations shall be all included in the protection scope of the attached claims of the present application.

INDUSTRIAL APPLICABILITY

By the scheme provided by the embodiment of the present disclosure, the data to be transmitted are graded, the corresponding redundant codes are computed, the redundant codes of important data (index files) are preferentially sent, thereby the important data are protected through the redundant codes thereof, the probability of packet loss of important data and terminal delay are deceased, the service quality of live broadcasting services of streaming media based on the HLS protocol is guaranteed and the user experience is improved.

What is claimed is:

1. A method for transmitting streaming media data, applied to a streaming media server, comprising:
    determining priorities of data blocks of different types in streaming media data;
    respectively encoding the data blocks in the streaming media data to be broadcasted live currently to generate corresponding redundant codes; and
    after the streaming media data to be broadcasted live currently are completely sent, sequentially sending the redundant codes corresponding to the data blocks according to the priorities of the data blocks in the streaming media data from high to low,
    wherein determining priorities of data blocks of different types in streaming media data comprises: determining an index file in the streaming media data to have a high priority and determining a Transport Stream (TS) file in the streaming media data to have a low priority,
    wherein the data blocks are index files or TS files,
    wherein after respectively encoding data blocks in streaming media data to be broadcasted live currently to generate corresponding redundant codes the method further comprises:
    whenever a redundant code corresponding to one index file is generated, putting the redundant code into a first queue; and
    whenever a redundant code corresponding to one TS file is generated, putting the redundant code into a second queue, and
    wherein both the first queue and the second queue are First Input First Output (FIFO) queues.

2. The method according to claim 1, wherein sequentially sending the redundant codes corresponding to the data blocks according to the priorities of the data blocks in the streaming media data from high to low comprises:
    preferentially sending the redundant codes in the first queue; and
    after the first queue is empty, sending the redundant codes in the second queue.

3. The method according to claim 1, wherein the streaming media data are data based on a HyperText Transfer Protocol (HTTP) Live Streaming (HLS) protocol.

4. An apparatus for transmitting streaming media data, applied to a streaming media server, comprising:
    a priority division module located in a processing device, where such a priority division module is designed to determine priorities of data blocks of different types in streaming media data;
    a redundant code encoding module located in a processing device, where such a priority division module is designed to respectively encode the data blocks in the streaming media data to be broadcasted live currently to generate corresponding redundant codes; and
    a redundant code sending module located in a processing device, where such a redundant code sending module is designed to, after the streaming media data to be broadcasted live currently are completely sent, sequentially send the redundant codes corresponding to the data blocks according to the priorities of the data blocks in the streaming media data from high to low,
    wherein the priority division module is designed to determine priorities of data blocks of different types in streaming media data by the following mode:
    determining an index file in the streaming media data to have a high priority and determining a Transport Stream (TS) file in the streaming media data to have a low priority,
    wherein the data blocks are index files or TS files,
    wherein the redundant code encoding module is further designed to, whenever a redundant code corresponding to one index file is generated, put the redundant code into a first queue, and whenever a redundant code corresponding to one TS file is generated, put the redundant code into a second queue, and
    wherein both the first queue and the second queue are First Input First Output, FIFO, queues.

5. The apparatus according to claim 4, wherein the redundant code sending module is designed to sequentially send the redundant codes corresponding to the data blocks according to the priorities of the data blocks in the streaming media data from high to low by the following mode:
    preferentially sending the redundant codes in the first queue; and
    after the first queue is empty, sending the redundant codes in the second queue.

6. The apparatus according to claim 4, wherein the streaming media data are data based on a HyperText Transfer Protocol (HTTP) Live Streaming (HLS) protocol.

7. The method according to claim 1, wherein the streaming media data are data based on a HyperText Transfer Protocol (HTTP) Live Streaming (HLS) protocol.

8. The method according to claim 2, wherein the streaming media data are data based on a HyperText Transfer Protocol (HTTP) Live Streaming (HLS) protocol.

9. The apparatus according to claim 4, wherein the streaming media data are data based on a HyperText Transfer Protocol (HTTP) Live Streaming (HLS) protocol.

10. The apparatus according to claim 5, wherein the streaming media data are data based on a HyperText Transfer Protocol (HTTP) Live Streaming (HLS) protocol.

* * * * *